US008922711B2

(12) United States Patent
Chang et al.

(10) Patent No.: US 8,922,711 B2
(45) Date of Patent: Dec. 30, 2014

(54) METHOD AND APPARATUS FOR DE-INTERLACING VIDEO DATA

(75) Inventors: Ching-Hua Chang, Taipei Hsien (TW); Wen-Tsai Liao, Taipei Hsien (TW); Po-Wei Chao, Taipei Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 2137 days.

(21) Appl. No.: 11/843,654

(22) Filed: Aug. 23, 2007

(65) Prior Publication Data
US 2008/0055465 A1 Mar. 6, 2008

(30) Foreign Application Priority Data

Aug. 29, 2006 (TW) .............................. 95131774 A

(51) Int. Cl.
*G06K 9/36* (2006.01)
*H04N 7/01* (2006.01)
(52) U.S. Cl.
CPC ..................... *H04N 7/012* (2013.01)
USPC ......................................... 348/451; 348/452
(58) Field of Classification Search
USPC .................................. 348/441–459
See application file for complete search history.

(56) References Cited

U.S. PATENT DOCUMENTS

| 5,796,437 | A | 8/1998 | Muraji | |
|---|---|---|---|---|
| 6,940,557 | B2 | 9/2005 | Handjojo | |
| 7,944,503 | B1 * | 5/2011 | Zhai et al. | 348/452 |
| 2002/0130969 | A1 * | 9/2002 | Han et al. | 348/452 |
| 2003/0112369 | A1 | 6/2003 | Yoo | |
| 2004/0233326 | A1 | 11/2004 | Yoo | |
| 2005/0012857 | A1 * | 1/2005 | Aoyama et al. | 348/459 |
| 2006/0023119 | A1 * | 2/2006 | Han | 348/452 |
| 2006/0110051 | A1 * | 5/2006 | Kondo et al. | 382/232 |
| 2006/0215058 | A1 * | 9/2006 | Lu et al. | 348/452 |
| 2007/0121001 | A1 * | 5/2007 | Wang et al. | 348/452 |
| 2007/0229534 | A1 * | 10/2007 | Kim et al. | 345/606 |

FOREIGN PATENT DOCUMENTS

| EP | 1 659 791 A1 | 5/2006 |
|---|---|---|
| KR | 1020040048478 | 6/2004 |
| KR | 1020040050577 | 6/2004 |
| TW | I238652 | 8/2005 |

\* cited by examiner

*Primary Examiner* — Benjamin R Bruckart
*Assistant Examiner* — Carmine Malangone
(74) *Attorney, Agent, or Firm* — Winston Hsu; Scott Margo

(57) ABSTRACT

The present invention provides a method and apparatus for de-interlacing video data by using a horizontal motion vector of a horizontal motion between fields. The horizontal motion regarding a target pixel of a frame is compensated if the horizontal motion vector is found to be substantially not null according to the pixels residing in the fields determined by the horizontal motion vector. This results in an upgraded quality of image after the de-interlacing process.

11 Claims, 6 Drawing Sheets

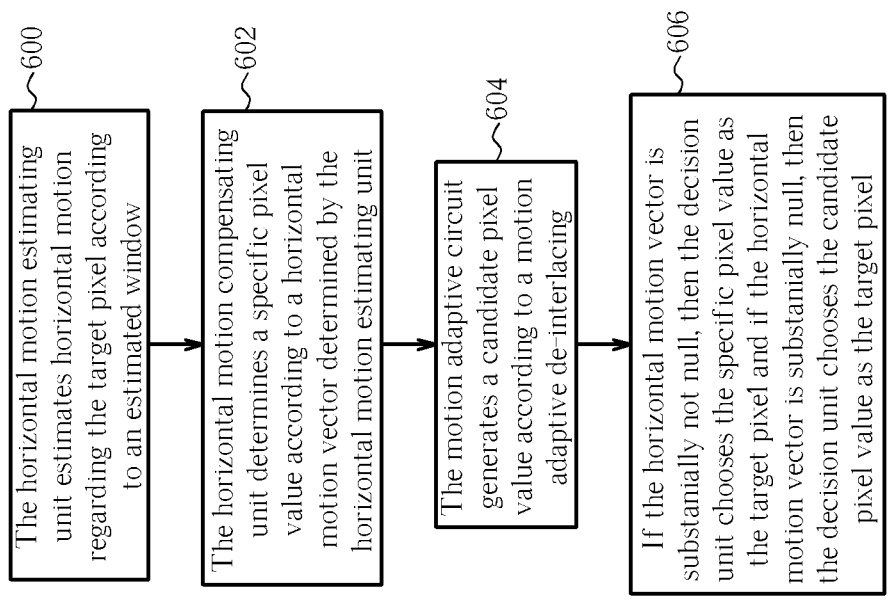

METHOD AND APPARATUS FOR DE-INTERLACING VIDEO DATA

BACKGROUND OF THE INVENTION

1. Field of the Invention

The present invention relates to an image de-interlacing method and apparatus, and more particularly, to an image de-interlacing method and apparatus that compensates video data with horizontal motion estimation.

2. Description of the Prior Art

In general, an interlaced scanning technique is to display two fields of a frame by interlacing. The two fields are respectively an odd field and an even field. A progressive scanning technique (i.e. non-interlaced scanning), on the other hand, merges the two fields into a frame, and doubles the scanning frequency of all the scan lines of the frame in order to display.

In order to display interlaced image data in sequence, a de-interlacing method suggests adding a new scan line between two sequential scan lines of a field. The motion-adaptive method is widely adopted to perform the operation of de-interlacing.

However, interpolation of high frequency motion is performed imprecisely in conventional motion adaptive methods. Furthermore, if the video data is encoded/decoded before the de-interlacing operation, a cross color phenomenon will distort the high frequency part of the data, affecting the interpolated result of the image. Therefore, the quality of the image after the de-interlaced process is unacceptable.

SUMMARY OF THE INVENTION

One of the objectives of the present invention is to provide an image de-interlacing method and the related apparatus. The image de-interlacing method and the related apparatus are able to detect a horizontal motion regarding a target pixel of a frame and compensate the horizontal motion according to a horizontal motion vector in order to improve image quality and decrease hardware cost.

According to an embodiment of the present invention, a de-interlacing method for de-interlacing video data is disclosed. The method estimates a horizontal motion to obtain a horizontal motion vector according to a first field and a third field, a third field and a fifth field, a second field and a fourth field, or combinations thereof regarding the video data. If the horizontal motion vector is substantially not null, a first pixel from the second field and a second pixel from the fourth field is selected according to the horizontal motion vector and a specific pixel value of a target pixel in the frame is obtained by interpolating the first pixel and the second pixel.

According to an embodiment of the present invention, a de-interlacing apparatus for de-interlacing video data is disclosed. The apparatus includes a horizontal motion estimating unit and a horizontal motion compensating unit. The horizontal motion estimating unit estimates a horizontal motion to obtain a horizontal motion vector, and if the horizontal motion vector is found to be substantially not null, then the horizontal motion compensating unit interpolates selected pixels to obtain a specific pixel value of a target pixel in the frame.

According to another embodiment of the present invention, a de-interlacing method for de-interlacing a video data is disclosed. The method determines a horizontal motion vector of a horizontal motion between fields of a same field type and compensates the horizontal motion regarding a target pixel of a frame if the horizontal motion vector is substantially not null according to pixels determined by the horizontal motion vector. The pixels that are concerned reside in fields of the same field type, and on the same scan line of the target pixel.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is a flow chart illustrating the process of de-interlacing performed by the de-interlacing apparatus shown in FIG. 5.

DETAILED DESCRIPTION

Figure 1:
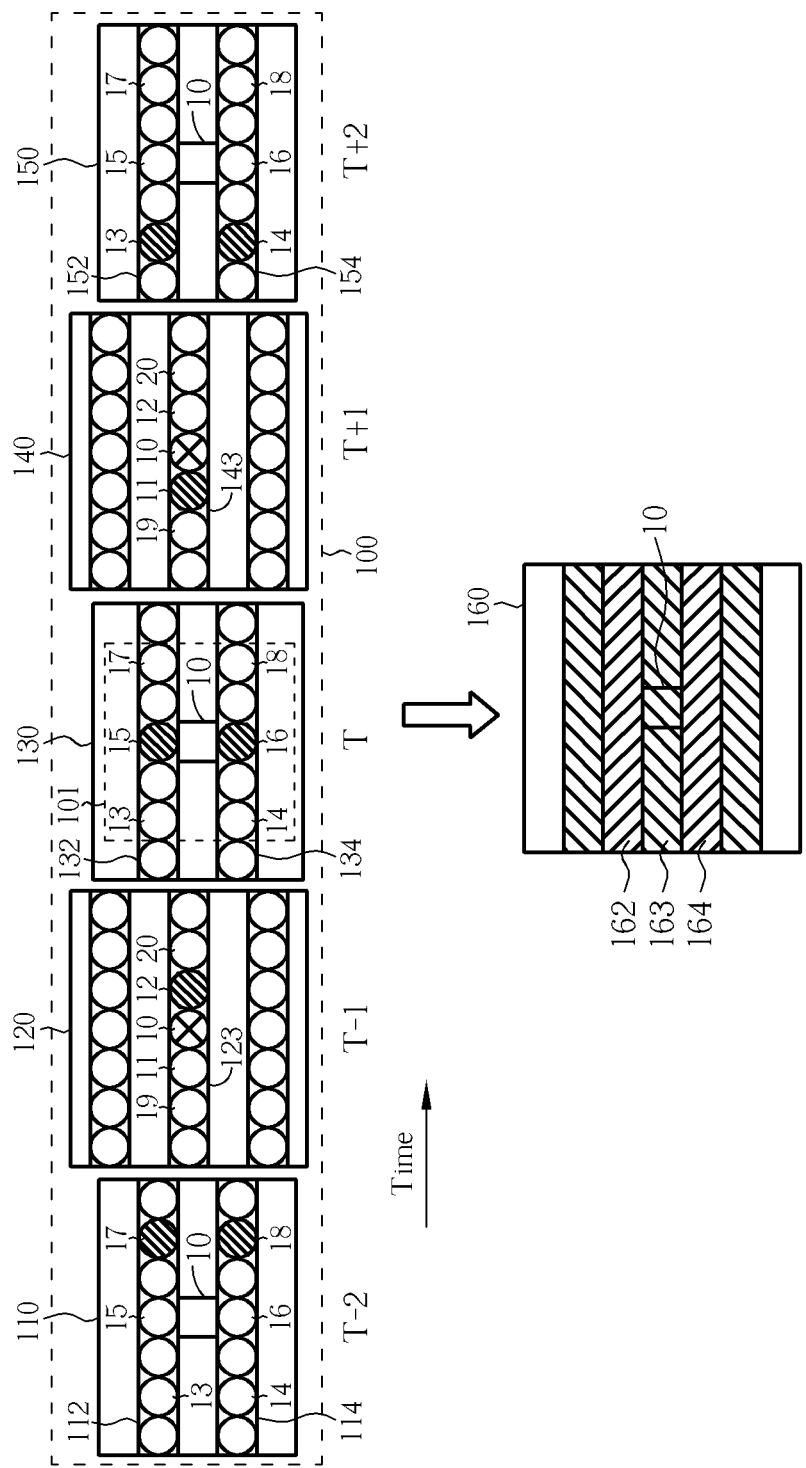
FIG. 1 is a diagram illustrating a video data that has five adjacent fields and a respective output frame.

Please refer to FIG. 1. FIG. 1 is a diagram illustrating a video data 100 that has five adjacent fields, and the respective output frame 160. The output frame 160 after the process of de-interlacing corresponds to time T, and the five adjacent fields 110, 120, 130, 140, and 150 in the video data 100 correspond to time T−2, T−1, T, T+1, and T+2 respectively. In FIG. 1, the scan lines 112, 132, 152, and 162 are the (N−1)th scan line of the fields 110, 130, 150, and 160, respectively. The scan lines 123, 143, and 163 are the Nth scan line of the fields 120, 140, and 160, respectively. The scan lines 114, 134, 154, and 164 are the (N+1)th scan line of the fields 110, 130, 150, and 160, respectively, wherein the (N−1)th scan line and the (N+1)th scan line belong to the same field type, whereas the Nth scan line belong to another field type. Furthermore, the above-mentioned de-interlacing method in the embodiment of the present invention operates on a pixel-by-pixel basis to generate the output frame 160.

Figure 2:
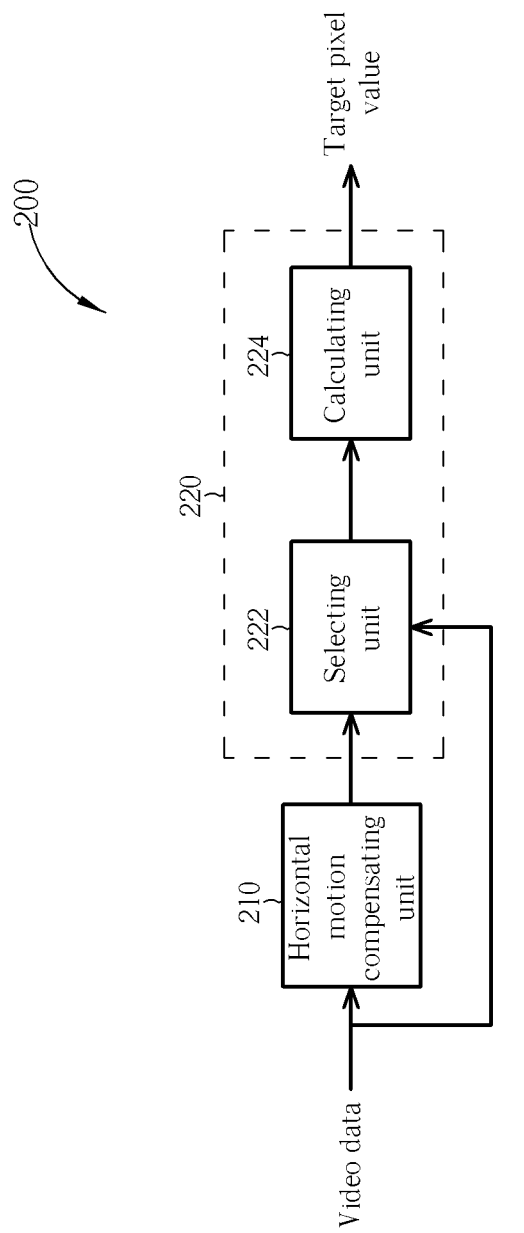
FIG. 2 is a diagram of a de-interlacing apparatus according to an embodiment of the present invention.

Please refer to FIG. 2. FIG. 2 is a de-interlacing apparatus 200 illustrated according to an embodiment of the present invention. The de-interlacing apparatus 200 includes a horizontal motion estimating unit 210 and a horizontal motion compensating unit 220. The horizontal motion compensating unit 220 comprises a selecting unit 222 and a calculating unit 224. When the video data enters the horizontal motion estimating unit 210 of the de-interlacing apparatus 200, the horizontal motion estimating unit 210 estimates horizontal motion of the video data. In this embodiment, the de-interlacing apparatus 200 performs de-interlacing processing upon a target pixel 10 corresponding to the frame 160. Therefore, the horizontal motion estimating unit 210 of the present invention determines the horizontal motion of the adjacent area regarding target pixel 10. The horizontal motion estimating unit 210 may set a window centered with the target pixel 10 and perform motion detection within the window. Please refer to the embodiment shown in FIG. 1. If an estimated window 101 is set to be a region of 2*5 pixels, then the horizontal motion estimating unit 210 compares the motion between the field 130 and the field 150, or between the field 130 and the field 110 within the estimated window 101;

and/or compares the motion between the field 120 and the field 140 within the estimated window 101. For example, the pixel values of the pixels 15, 16 of the field 130 as shown in FIG. 1 are shifted to locations of pixels 13, 14 of the field 150; or the pixel value of the pixel 12 of the field 120 is shifted to the location of pixel 11 of the field 140. Accordingly, the horizontal motion estimating unit 210 in this embodiment will determine that horizontal motion occurred in the adjacent area of the target pixel 10 and the horizontal motion vector is regarded as +2 pixels in magnitude (can also be expressed in a simplified form of +2).

Figure 3:
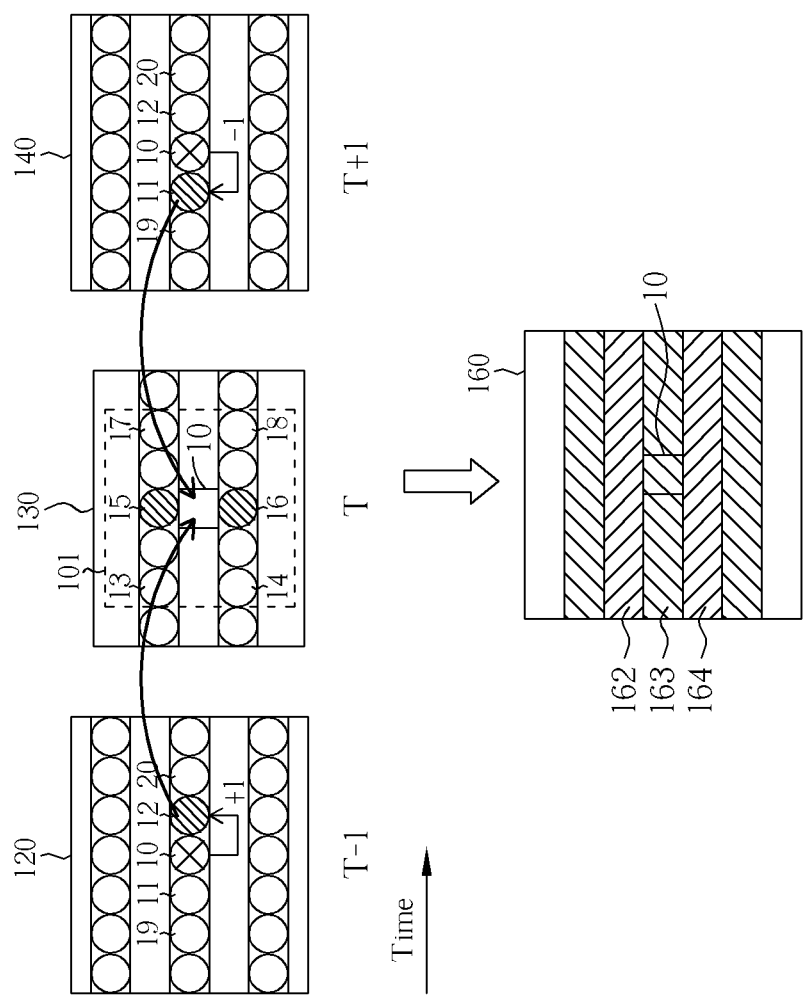
FIG. 3 is a diagram illustrating horizontal motion compensation performed by the horizontal motion compensating unit of the present invention.

Please refer to FIG. 3. FIG. 3 is a diagram illustrating the horizontal motion compensation performed by the horizontal motion compensating unit 220 of the present invention. The horizontal motion vector determined by the horizontal motion estimating unit 210 enters the selecting unit 222 of the horizontal motion compensating unit 220, and the selecting unit 222 selects the reference pixel for interpolation in order to obtain the target pixel 10 according to the horizontal motion vector. As the horizontal motion vector is +2, the selecting unit 222 selects the pixel 12 of an earlier field 120 and selects the pixel 11 of a later field 140 to be the reference pixels for obtaining the target pixel 10 through interpolation. Please note that in this embodiment, the horizontal motion vector is an even number, therefore the horizontal motion compensating unit 220 selects an earlier appearing pixel and a later appearing pixel to be the reference pixels. However, if the horizontal motion vector is an odd number (e.g. +3), then the horizontal motion compensating unit 220 of the present invention may select two earlier appearing pixels and two later appearing pixels to be the reference pixels. For example, when the horizontal motion vector is +3, the selecting unit 222 may select the pixels 12, 20 of an earlier field 120 and the pixels 11, 19 of a later field 140 to be the reference pixels. The reference pixels are then used for interpolation in order to obtain the target pixel 10. The calculating unit 224 of the horizontal motion compensating unit 220 in this embodiment chooses the average pixel value of the reference pixels corresponding to the target pixel 10 for interpolation, such that the average pixel values (average pixel values of pixels 12, 20 and pixels 11, 19 respectively) are interpolated in order to obtain the pixel value of the target pixel 10 regarding frame 160. Hence, the de-interlacing process is accomplished.

Figure 4:
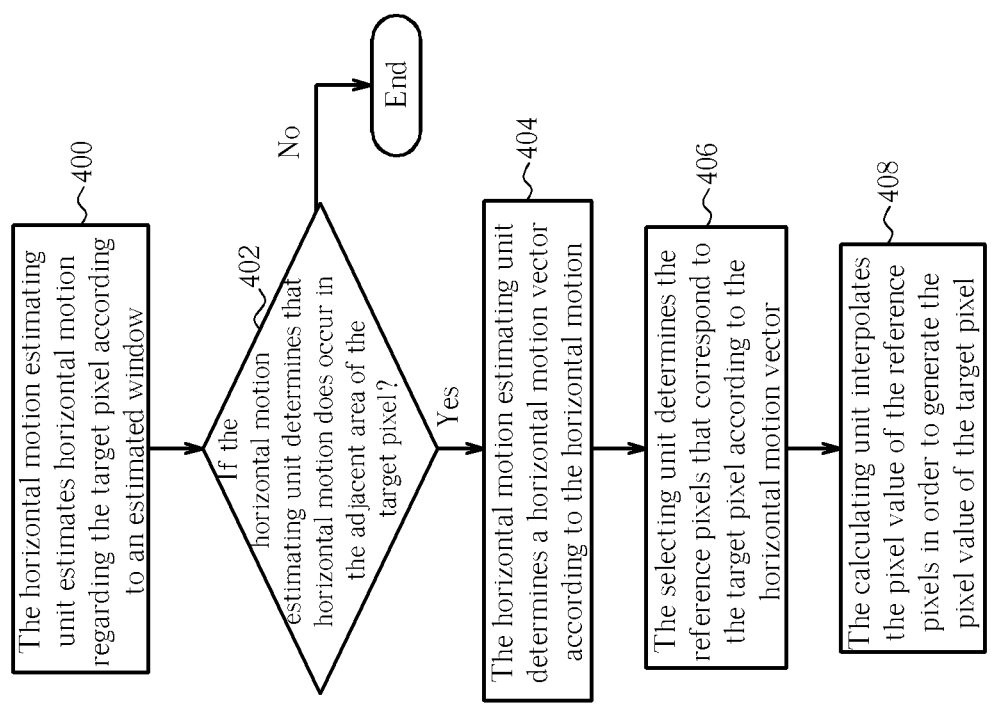
FIG. 4 is a flow chart illustrating the process of de-interlacing performed by the de-interlacing apparatus shown in FIG. 2.

Please refer to FIG. 4. FIG. 4 is a flow chart illustrating the de-interlacing process performed by the de-interlacing apparatus 200 as shown in FIG. 2. Please note that provided the same result is achieved substantially, the steps of the flowchart shown in FIG. 4 need not be in the exact order shown and need not be contiguous, that is, other steps can be inserted accordingly. The process of de-interlacing performed by the de-interlacing apparatus 200 is briefly described as the following steps:

Step 400: The horizontal motion estimating unit 210 estimates horizontal motion regarding the target pixel 10 according to an estimated window 101.

Step 402: If the horizontal motion estimating unit 210 determines that horizontal motion does occur in the adjacent area of the target pixel 10, then go to step 404; otherwise terminate the de-interlacing process.

Step 404: The horizontal motion estimating unit 210 determines a horizontal motion vector (substantially not null if horizontal motion does occur) according to the horizontal motion.

Step 406: The selecting unit 222 determines the reference pixels 11, 12 that correspond to the target pixel 10 according to the horizontal motion vector.

Step 408: The calculating unit 224 interpolates the pixel value of the reference pixels 11, 12 in order to generate the pixel value of the target pixel 10.

Figure 5:
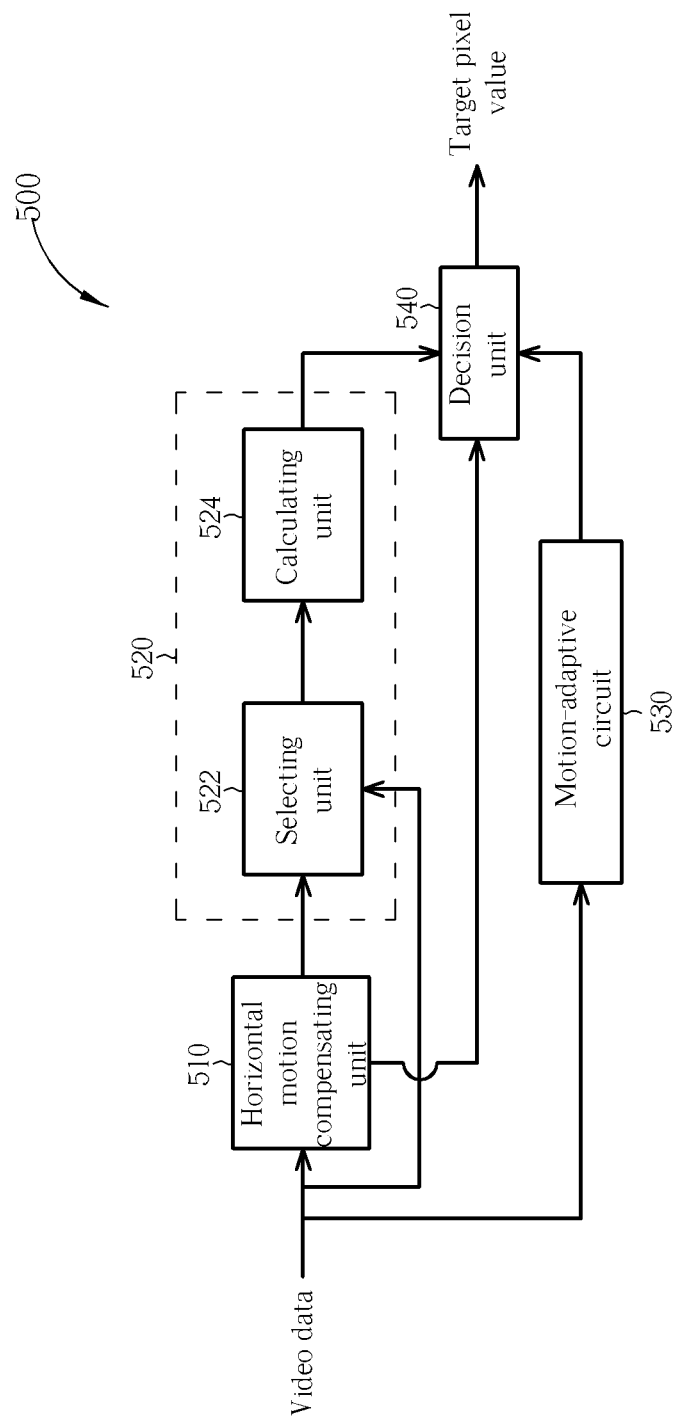
FIG. 5 is a diagram of a de-interlacing apparatus according to another embodiment of the present invention.

Please refer to FIG. 5. FIG. 5 is a de-interlacing apparatus 500 illustrated according to another embodiment of the present invention. The de-interlacing apparatus 500 includes a horizontal motion estimating unit 510 and a horizontal motion compensating unit 520, a motion adaptive circuit 530, and a decision unit 540. The horizontal motion compensating unit 520 includes a selecting unit 522 and calculating unit 524. Please note that the components of the de-interlacing apparatus 500 that bear the same device name as those of the de-interlacing apparatus 200 shown in FIG. 2 function in a similar fashion, the detailed description is therefore omitted here for brevity. Despite that a conventional motion adaptive circuit 530 provides de-interlacing, the conventional motion adaptive circuit may not be able to perform interpolation of high frequency motion precisely, which may cause image distortions. Therefore, the horizontal motion estimating unit 510 and the horizontal motion compensating unit 520 of the present invention are adopted to support the motion adaptive circuit 530. In this embodiment, when the horizontal motion estimating unit 510 estimates horizontal motion regarding a target pixel, video data undergoes detection of horizontal motion. If horizontal motion regarding the target pixel 10 occurs, then the decision unit 540 generates the pixel value of the target pixel 10 by selecting the pixel value that is calculated by the horizontal motion compensating unit 520, rather than the pixel value calculated by the motion adaptive circuit 530. On the other hand, if the horizontal motion estimating unit 510 determines that no horizontal motion regarding the target pixel 10 occurs, then the decision unit 540 generates the pixel value of the target pixel 10 by selecting the pixel value that is calculated by the motion adaptive circuit 530, rather than the pixel value calculated by the horizontal motion compensating unit 520. Therefore, the de-interlacing apparatus 500 of the present invention compensates the target pixel 10 depending on whether horizontal motion regarding the target pixel occurs or not. Accordingly, the de-interlacing apparatus 500 increases the precision and sensitivity of the de-interlacing method, which furthermore improves the quality of the image substantially.

Please refer to FIG. 6. FIG. 6 is a flow chart illustrating the process of de-interlacing performed by the de-interlacing apparatus 500 as shown in FIG. 5. Please note that provided the same result is achieved substantially, the steps of the flowchart shown in FIG. 6 need not be in the exact order shown and need not be contiguous, that is, other steps can be inserted accordingly. The process of de-interlacing performed by the de-interlacing apparatus 500 is briefly described as the following steps:

Step 600: The horizontal motion estimating unit 510 estimates horizontal motion regarding the target pixel 10 according to an estimated window 101.

Step 602: The horizontal motion compensating unit 520 determines a specific pixel value according to a horizontal motion vector determined by the horizontal motion estimating unit 510.

Step 604: The motion adaptive circuit 530 generates a candidate pixel value according to a motion adaptive de-interlacing.

Step 606: If the horizontal motion vector is substantially not null, then the decision unit 540 chooses the specific pixel value as the target pixel; and if the horizontal motion vector is substantially null, then the decision unit 540 chooses the candidate pixel value as the target pixel.

The present invention provides image de-interlacing with horizontal motion estimation and horizontal motion compensation and adopts an estimate window to detect the horizontal motion of the target window. Therefore, the hardware that is required to search a large area can be saved. The de-interlacing apparatus and method of the present invention also utilizes horizontal motion estimation and horizontal motion in cooperation with motion adaptive de-interlacing, which increases the precision and the sensitivity of the de-interlacing, and furthermore improves the quality of the image substantially.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A de-interlacing method for de-interlacing a video data, the video data comprising a first field, a second field, a third field, a fourth field, and a fifth field, the video data generating a frame when the third field is outputted, the method comprising the following steps:

estimating a horizontal motion to obtain a horizontal motion vector according to the first field and the third field, the third field and the fifth field, or the second field and the fourth field; and if the horizontal motion vector is substantially not null, then:

selecting a first pixel from the second field and selecting a second pixel from the fourth field according to the horizontal motion vector; and interpolating the first pixel and the second pixel to obtain a specific pixel value of a target pixel in the frame, wherein if the obtained horizontal motion vector is 2N+1 pixels in magnitude, then the step of interpolating the first pixel and the second pixel comprises the following steps:

selecting a pixel of the second field that lies N pixels away from the target pixel as the first pixel and selecting a pixel of the second field that lies N+1 pixels away from the target pixel as a third pixel according to the horizontal motion vector, wherein the first pixel and the third pixel are adjacent;

selecting a pixel of the fourth field that lies N pixels away from the target pixel as the second pixel and selecting a pixel of the fourth field that lies N+1 pixels away from the target pixel as a fourth pixel according to the horizontal motion vector, wherein the second pixel and the fourth pixel are adjacent; and\ averaging pixel values of the first pixel, the second pixel, the third pixel, and the fourth pixel to generate the specific pixel value and, wherein the first, second, third, fourth and fifth fields are consecutive fields of the video data.

2. The method of claim 1, wherein the first pixel, the second pixel, and the target pixel are positioned at a same horizontal scan line and the first pixel and the second pixel are respectively positioned at both sides of the target pixel.

3. The method of claim 1, wherein the horizontal motion vector is obtained by the following steps:

setting a pixel processing window according to the target pixel; and estimating the horizontal motion within the pixel processing window to obtain the horizontal motion vector.

4. The method of claim 1, wherein if the detected horizontal motion vector is 2N pixels in magnitude, then the step of interpolating the first pixel and the second pixel comprises the following steps:

selecting a pixel of the second field that lies N pixels away from the target pixel as the first pixel according to the horizontal motion vector;

selecting a pixel of the fourth field that lies N pixels away from the target pixel as the second pixel according to the horizontal motion vector; and averaging pixel value of the first pixel and pixel value of the second pixel to generate the specific pixel value.

5. The method of claim 1, further comprising the following step:

motion adaptive de-interlacing the video data to generate a candidate pixel value of the target pixel.

6. The method of claim 5, further comprising the following step:

setting the candidate pixel value as the specific pixel value of the target pixel if the horizontal motion vector is substantially null.

7. A de-interlacing apparatus, for de-interlacing a video data, the video data comprising a first field, a second field, a third field, a fourth field, and a fifth field, the video data generating a frame when the third field is outputted, the apparatus comprising:

a horizontal motion estimating unit, for estimating a horizontal motion to obtain a horizontal motion vector according to the first field and the third field, the third field and the fifth field, or the second field and the fourth field, and a horizontal motion compensating unit, coupled to the horizontal motion estimating unit, wherein if the horizontal motion vector is substantially not null, then the horizontal motion compensating unit selects a first pixel from the second field and selects a second pixel from the fourth field according to the horizontal motion vector and interpolates the first pixel and the second pixel to obtain a specific pixel value of a target pixel in the frame, wherein the horizontal motion estimating unit comprises:

a selecting unit, for selecting a pixel of the second field that lies N pixels away from the target pixel as the first pixel, a pixel of the second field that lies N+1 pixels away from the target pixel as a third pixel, a pixel of the fourth field that lies N pixels away from the target pixel as the second pixel, and a pixel of the fourth field that lies N+1 pixels away from the target pixel as a fourth pixel according to the horizontal motion vector respectively, wherein the first pixel and the third pixel are adjacent and the second pixel and the fourth pixel are adjacent; and a calculating unit, coupled to the selecting unit, for calculating an average of the pixel values of the first pixel, the second pixel, the third pixel, and the fourth pixel to generate the specific pixel value;

wherein the horizontal motion vector is 2N+1 pixels in magnitude and, wherein the first, second, third, fourth and fifth fields are consecutive fields of the video data.

8. The apparatus of claim 7, wherein the first pixel, the second pixel, and the target pixel are positioned on a same horizontal scan line and the first pixel and the second pixel are positioned at both sides of the target pixel.

9. The apparatus of claim 7, wherein the horizontal motion estimating unit sets a pixel processing window according to the target pixel, and estimates the horizontal motion within the pixel processing window to obtain the horizontal motion vector.

10. The apparatus of claim 7, further comprising:
a motion adaptive circuit, for motion adaptive de-interlacing the video data to generate a candidate pixel value of the target pixel.

11. The apparatus of claim 7, further comprising:
a decision unit, for setting the specific pixel value as the pixel value of the target pixel according to the horizontal motion vector if the horizontal motion vector is substantially not null and for setting the candidate pixel value as the specific pixel value of the target pixel if the horizontal motion vector is substantially null.

* * * * *